(12) United States Patent
Giacobone et al.

(10) Patent No.: US 11,473,439 B1
(45) Date of Patent: Oct. 18, 2022

(54) GAS TURBINE ENGINE WITH HOLLOW ROTOR IN FLUID COMMUNICATION WITH A BALANCE PISTON CAVITY

(71) Applicants: General Electric Company, Schenectady, NY (US); GE Avio S.r.l., Rivalta di Turin (IT)

(72) Inventors: Luca Giacobone, Turin (IT); Matteo Renato Usseglio, Turin (IT); Andrea Depalma, Rivoli (IT); Roberto Maddaleno, Lanzo Torinese (IT); Darek Tomasz Zatorski, Fort Wright, KY (US)

(73) Assignees: General Electric Company, Schenectady, NY (US); GE AVIO S.R.L., Rivalta di Turin (IT)

( * ) Notice: Subject to any disclaimer, the term of this patent is extended or adjusted under 35 U.S.C. 154(b) by 0 days.

(21) Appl. No.: 17/448,621

(22) Filed: Sep. 23, 2021

(51) Int. Cl.
  *F01D 9/06* (2006.01)
  *F01D 11/10* (2006.01)
  (Continued)

(52) U.S. Cl.
  CPC .............. *F01D 11/10* (2013.01); *F01D 9/065* (2013.01); *F01D 11/001* (2013.01); *F01D 11/02* (2013.01);
  (Continued)

(58) Field of Classification Search
  CPC ........ F01D 9/065; F01D 11/001; F01D 11/02; F16J 15/002; F05D 2220/32; F05D 2240/55
  See application file for complete search history.

(56) References Cited

U.S. PATENT DOCUMENTS 5,154,048 A * 10/1992 Ponziani ................... F01D 5/08
                                                              415/107
5,167,484 A * 12/1992 Ponziani ................. F01D 9/065
                                                              415/104
(Continued)

FOREIGN PATENT DOCUMENTS

JP          2005069167 A        3/2005

*Primary Examiner* — David E Sosnowski
*Assistant Examiner* — Theodore C Ribadeneyra
(74) *Attorney, Agent, or Firm* — Dority & Manning, P.A.

(57) ABSTRACT

A gas turbine engine defining a longitudinal direction and a radial direction is provided. The gas turbine engine includes a turbine section comprising a stationary outer portion, a first rotating component, and a second rotating component, wherein the first rotating component includes an aft airfoil defining a hollow passageway and coupled to a radially extended first rotor portion, wherein the hollow passageway is in fluid communication with the stationary outer portion, wherein the second rotating component is coupled to a radially extended second rotor portion; and a seal assembly between a portion of the first rotating component and the second rotating component, the seal assembly defining a balance piston cavity therebetween, wherein the balance piston cavity is in fluid communication with the hollow passageway, wherein a flow of air is routed through the stationary outer portion and the hollow passageway to the balance piston cavity, and wherein a pressure of the flow of air within the balance piston cavity is controlled to provide an axial thrust that counteracts a thrust load on the second rotor portion.

15 Claims, 3 Drawing Sheets

(51) Int. Cl.
*F16J 15/00* (2006.01)
*F01D 11/00* (2006.01)
*F01D 11/02* (2006.01)

(52) U.S. Cl.
CPC ......... *F16J 15/002* (2013.01); *F05D 2220/32* (2013.01); *F05D 2240/55* (2013.01)

(56) References Cited

U.S. PATENT DOCUMENTS

| | | | | |
|---|---|---|---|---|
| 5,292,227 | A * | 3/1994 | Czachor | F01D 9/065 |
| | | | | 415/142 |
| 7,048,496 | B2 | 5/2006 | Proctor et al. | |
| 7,775,758 | B2 | 8/2010 | Legare | |
| 8,366,382 | B1 * | 2/2013 | Muldoon | F02C 7/06 |
| | | | | 60/785 |
| 8,915,057 | B2 | 12/2014 | Corattiyil et al. | |
| 9,803,501 | B2 | 10/2017 | Wang | |
| 9,951,636 | B2 | 4/2018 | Mareix et al. | |
| 10,087,782 | B2 | 10/2018 | Wang et al. | |
| 2010/0132374 | A1 * | 6/2010 | Manteiga | F01D 25/28 |
| | | | | 415/213.1 |
| 2010/0135777 | A1 * | 6/2010 | Manteiga | F01D 9/02 |
| | | | | 415/213.1 |
| 2010/0135786 | A1 * | 6/2010 | Manteiga | F01D 25/18 |
| | | | | 415/232 |
| 2010/0303610 | A1 * | 12/2010 | Wang | F01D 5/18 |
| | | | | 415/115 |
| 2011/0079019 | A1 * | 4/2011 | Durocher | F02C 7/12 |
| | | | | 60/796 |
| 2013/0078080 | A1 * | 3/2013 | Durocher | F01D 11/04 |
| | | | | 415/110 |
| 2013/0195627 | A1 | 8/2013 | Glahn et al. | |
| 2014/0119880 | A1 * | 5/2014 | Rodriguez | F01D 25/162 |
| | | | | 415/1 |
| 2016/0090914 | A1 * | 3/2016 | Lyons | F02C 7/04 |
| | | | | 415/208.1 |
| 2017/0342851 | A1 * | 11/2017 | Narasimharao | F01D 5/085 |
| 2018/0051702 | A1 * | 2/2018 | Kupiszewski | B64C 21/06 |
| 2018/0142565 | A1 * | 5/2018 | Theratil | F16J 15/3288 |
| 2019/0003326 | A1 * | 1/2019 | Simeone | F01D 11/008 |

* cited by examiner

GAS TURBINE ENGINE WITH HOLLOW ROTOR IN FLUID COMMUNICATION WITH A BALANCE PISTON CAVITY

FIELD

The present subject matter relates generally to a gas turbine engine, or more particularly to a gas turbine engine with a rotating frame including a hollow rotor in fluid communication with a balance piston cavity.

BACKGROUND

Gas turbine engines generally include a turbine section downstream of a combustion section that is rotatable with a compressor section to rotate and operate the gas turbine engine to generate power, such as propulsive thrust. General gas turbine engine design criteria often include conflicting criteria that must be balanced or compromised, including increasing fuel efficiency, operational efficiency, and/or power output while maintaining or reducing weight, part count, and/or packaging (i.e. axial and/or radial dimensions of the engine).

Conventional gas turbine engines generally include turbine sections defining a high pressure turbine in serial flow arrangement with an intermediate pressure turbine and/or low pressure turbine. The high pressure turbine includes an inlet or nozzle guide vane between the combustion section and the high pressure turbine rotor. Conventionally, combustion gases exiting the combustion section define a relatively low velocity compared to a velocity (e.g., along a circumferential or tangential direction) of the first rotating stage of the turbine, generally defined as the high pressure turbine rotor. Thus, conventionally, the nozzle guide vane serves to accelerate a flow of combustion gases exiting the combustion section to more closely match or exceed the high pressure turbine rotor speed along a tangential or circumferential direction. Such acceleration of flow using a nozzle guide vane to match or exceed high pressure turbine rotor speed is known to improve general engine operability and performance.

Furthermore, conventional gas turbine engine turbine sections generally include successive rows or stages of stationary and rotating airfoils, or vanes and blades, respectively. This conventional configuration generally conditions a flow of the combustion gases entering and exiting each stage of vanes and blades. However, conventional turbine sections, and especially stationary airfoils (i.e. vanes and nozzle guide vanes) require considerable quantities and masses of cooling air to mitigate damage due to hot combustion gases. For example, generally, nozzle guide vanes are designed to withstand a maximum combustion gas temperature along an annulus (i.e. hot spots), which may be significantly larger than an average combustion gas temperature along the annulus.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine defining a longitudinal direction and a radial direction is provided. The gas turbine engine includes a turbine section comprising a stationary outer portion, a first rotating component, and a second rotating component, wherein the first rotating component includes an aft airfoil defining a hollow passageway and coupled to a radially extended first rotor portion, wherein the hollow passageway is in fluid communication with the stationary outer portion, wherein the second rotating component is coupled to a radially extended second rotor portion; and a seal assembly between a portion of the first rotating component and the second rotating component, the seal assembly defining a balance piston cavity therebetween, wherein the balance piston cavity is in fluid communication with the hollow passageway, wherein a flow of air is routed through the stationary outer portion and the hollow passageway to the balance piston cavity, and wherein a pressure of the flow of air within the balance piston cavity is controlled to provide an axial thrust that counteracts a thrust load on the second rotor portion.

In certain exemplary embodiments the first rotating component is interdigitated with the second rotating component along the longitudinal direction.

In certain exemplary embodiments the first rotating component rotates in a first direction and the second rotating component rotates in a second direction opposite of the first direction.

In certain exemplary embodiments the second rotating component rotates at a speed greater than the first rotating component.

In certain exemplary embodiments the seal assembly includes a first seal between a first portion of the first rotating component and the second rotating component; and a second seal between a second portion of the first rotating component and the second rotating component, wherein the balance piston cavity is defined between the first seal and the second seal.

In certain exemplary embodiments the balance piston cavity reduces a thrust on a bearing in the turbine section.

In certain exemplary embodiments the flow of air routed through the stationary outer portion and the hollow passageway to the balance piston cavity provides an integrated cooling system to the turbine section.

In certain exemplary embodiments the stationary outer portion comprises a low pressure turbine outer band.

In certain exemplary embodiments the low pressure turbine outer band is directly connected to a portion of a compressor section.

In an exemplary aspect of the present disclosure, a method is provided for controlling a pressure within a turbine section of a gas turbine engine, wherein the gas turbine engine defines a longitudinal direction and a radial direction, and the turbine section includes a stationary outer portion, a first rotating component, and a second rotating component, the method comprising: providing the first rotating component with an aft airfoil defining a hollow passageway and coupled to a radially extended first rotor portion, wherein the hollow passageway is in fluid communication with the stationary outer portion, and wherein the second rotating component is coupled to a radially extended second rotor portion; providing a seal assembly between a portion of the first rotating component and the second rotating component, the seal assembly defining a balance piston cavity therebetween, wherein the balance piston cavity is in fluid communication with the hollow passageway; routing a flow of air through the stationary outer portion and the hollow passageway to the balance piston cavity; and controlling a pressure of the flow of air within the balance piston cavity to provide an axial thrust that counteracts a thrust load on the second rotor portion.

In certain exemplary aspects the first rotating component is interdigitated with the second rotating component along the longitudinal direction.

In certain exemplary aspects the first rotating component rotates in a first direction and the second rotating component rotates in a second direction opposite of the first direction, and wherein the second rotating component rotates at a speed greater than the first rotating component.

In certain exemplary aspects the seal assembly includes a first seal between a first portion of the first rotating component and the second rotating component; and a second seal between a second portion of the first rotating component and the second rotating component, wherein the balance piston cavity is defined between the first seal and the second seal.

In certain exemplary aspects the balance piston cavity reduces a thrust on a bearing in the turbine section.

In certain exemplary aspects the flow of air routed through the stationary outer portion and the hollow passageway to the balance piston cavity provides an integrated cooling system to the turbine section.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin. Here and throughout the specification and claims, range limitations are combined and interchanged, such ranges are identified and include all the sub-ranges contained therein unless context or language indicates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A turbine section of the present disclosure includes a stationary outer portion and a first rotating component interdigitated with a second rotating component. The first rotating component includes an aft airfoil defining a hollow passageway. The turbine section also includes a seal assembly that is located between a portion of the first rotating component and the second rotating component and defines a balance piston cavity therebetween.

The hollow passageway of the aft airfoil is in fluid communication with a passageway of the stationary outer portion and the balance piston cavity defined by the seal assembly is in fluid communication with the hollow passageway of the aft airfoil. Accordingly, a flow path of the present disclosure comprises a flow of air from a portion of the gas turbine engine, e.g., a compressor section, being routed through the passageway of the stationary outer portion and the hollow passageway of the aft airfoil to the balance piston cavity defined by the seal assembly. In this manner, a pressure of the flow of air within the balance piston cavity is controlled to provide an axial thrust that counteracts a thrust load on a high speed or second rotor portion. In other words, the embedded air channels of the present disclosure allow for the control of a counteracting axial thrust to balance a thrust load on the second rotor portion. Furthermore, the embedded air channels of the present disclosure allow for the control of pressurizing chambers of the turbine section, e.g., the balance piston cavity.

Figure 1:
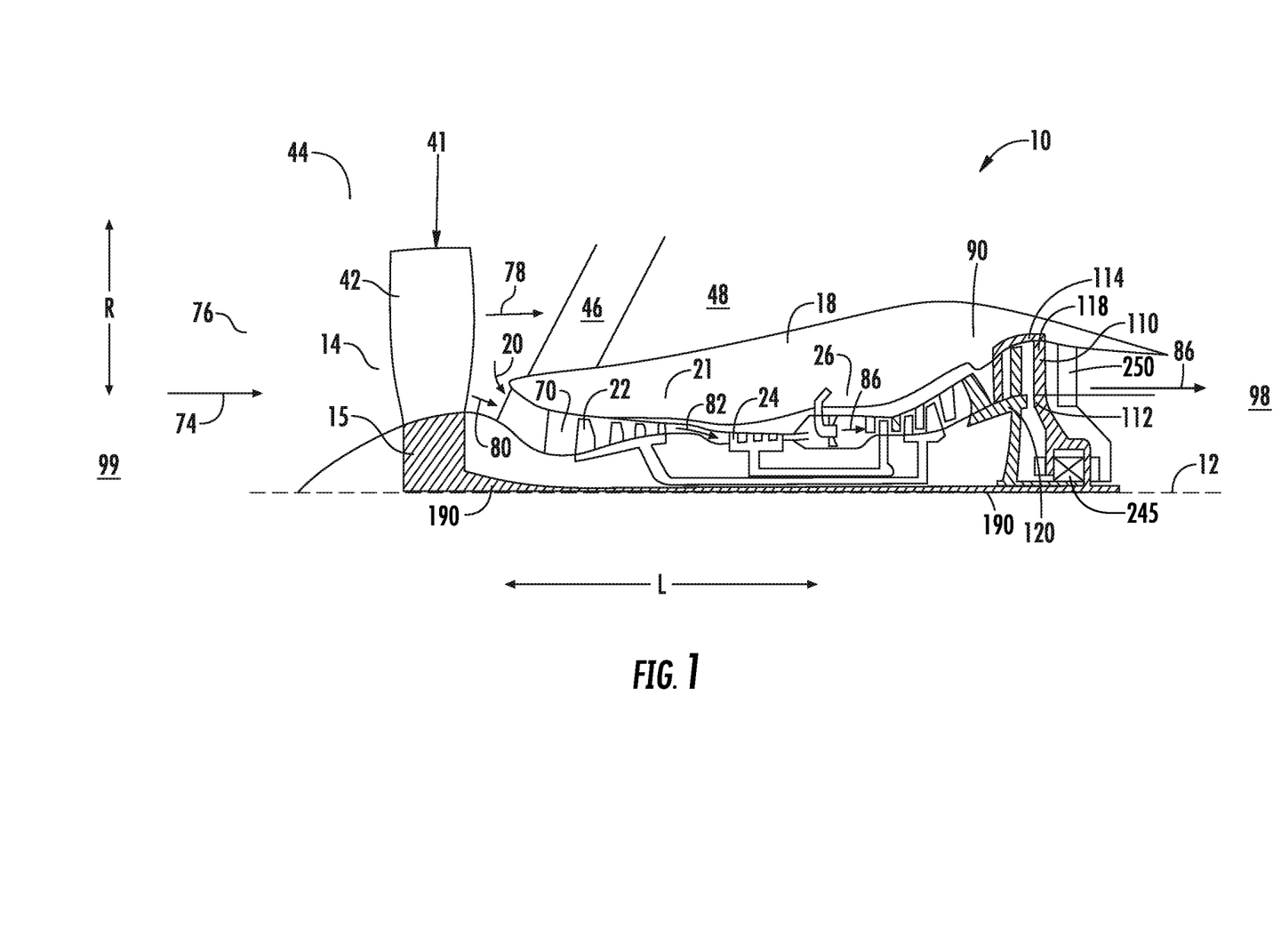
FIG. 1 is a schematic cross-sectional view of an exemplary gas turbine engine in accordance with exemplary embodiments of the present disclosure.

Referring now to the drawings, FIG. 1 is a schematic cross sectional view of an exemplary gas turbine engine 10, shown as a high bypass turbofan engine, incorporating an exemplary embodiment of a turbine section 90 according to an aspect of the present disclosure. Although further described below with reference to a turbofan engine, the present disclosure is also applicable to turbomachinery in general, including propfan, turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes. The engine 10 defines a longitudinal direction L, a radial direction R, and an upstream end 99 and a downstream end 98 along the longitudinal direction L.

In general, the engine 10 may include a substantially tubular outer casing 18 that defines an annular inlet 20. The outer casing 18 encases or at least partially flows, in serial flow arrangement, a compressor section 21, a combustion section 26, and an interdigitated turbine section 90. In the embodiment shown in FIG. 1, the compressor section 21 defines a high pressure compressor (HPC) 24 and an intermediate pressure compressor (IPC) 22 in serial arrangement.

A fan assembly 14 is disposed forward or upstream of the compressor section 21. The fan assembly 14 includes a fan rotor 15. The fan rotor 15 includes one or more fan stages 41, in which each fan stage 41 defines a plurality of blades 42 that are coupled to and extend outwardly from the fan rotor 15 in the radial direction R. In an exemplary embodiment, the fan rotor 15 defines a single fan stage or single circumferentially adjacent arrangement of the plurality of blades 42. In other exemplary embodiments, the fan assembly 14 may further define a plurality of the stages 41. The fan rotor 15 are together rotatable about the axial centerline 12. An annular fan casing or nacelle 44 circumferentially surrounds at least a portion of the fan assembly 14 and/or at least a portion of the outer casing 18. In one embodiment, the nacelle 44 may be supported relative to the outer casing 18 by a plurality of circumferentially-spaced outlet guide vanes or struts 46. At least a portion of the nacelle 44 may extend over an outer portion (in the radial direction R) of the outer casing 18 so as to define a bypass airflow passage 48 therebetween.

During operation of the engine 10, a volume of air as indicated schematically by arrows 74 enters the engine 10 through an associated inlet 76 of the nacelle and/or fan assembly 14. As the air 74 passes across the blades 42 of the fan assembly 14, a portion of the air as indicated schematically by arrows 78 is directed or routed into the bypass airflow passage 48 while another portion of the air as indicated schematically by arrows 80 is directed or through the fan assembly 14. Air 80 is progressively compressed as it flows through the compressor section 21 toward the combustion section 26.

The now compressed air, as indicated schematically by arrows 82, flows into the combustion section 26 where a fuel is introduced, mixed with at least a portion of the compressed air 82, and ignited to form combustion gases 86. The combustion gases 86 flow into the turbine section 90, causing rotary members of the turbine section 90 to rotate and support operation of respectively coupled rotary members in the compressor section 21 and/or fan assembly 14.

In various embodiments including an interdigitated turbine section, the counter rotating turbine engine may increase fuel efficiency, operational efficiency, and/or power output while reducing weight, part count, and/or packaging (e.g. radial and/or axial dimensions). For example, the interdigitated turbine section may enable a fan assembly to operate at an increased bypass ratio and/or enable the gas turbine engine to operate at an increased overall pressure ratio, thereby increasing fuel efficiency, operational efficiency, and/or power output relative to other engines of similar power output and/or packaging. The interdigitated turbine section may further reduce stationary and/or rotating airfoil quantities, and thereby engine packaging and/or weight, while maintaining or improving efficiencies, performance, or power output. Still further, the interdigitated turbine section may reduce a product of axial flow area and the square of the rotational speed relative to an engine incorporating a reduction gear assembly, while additionally reducing an average work factor per stage of the turbine section.

Figure 2:
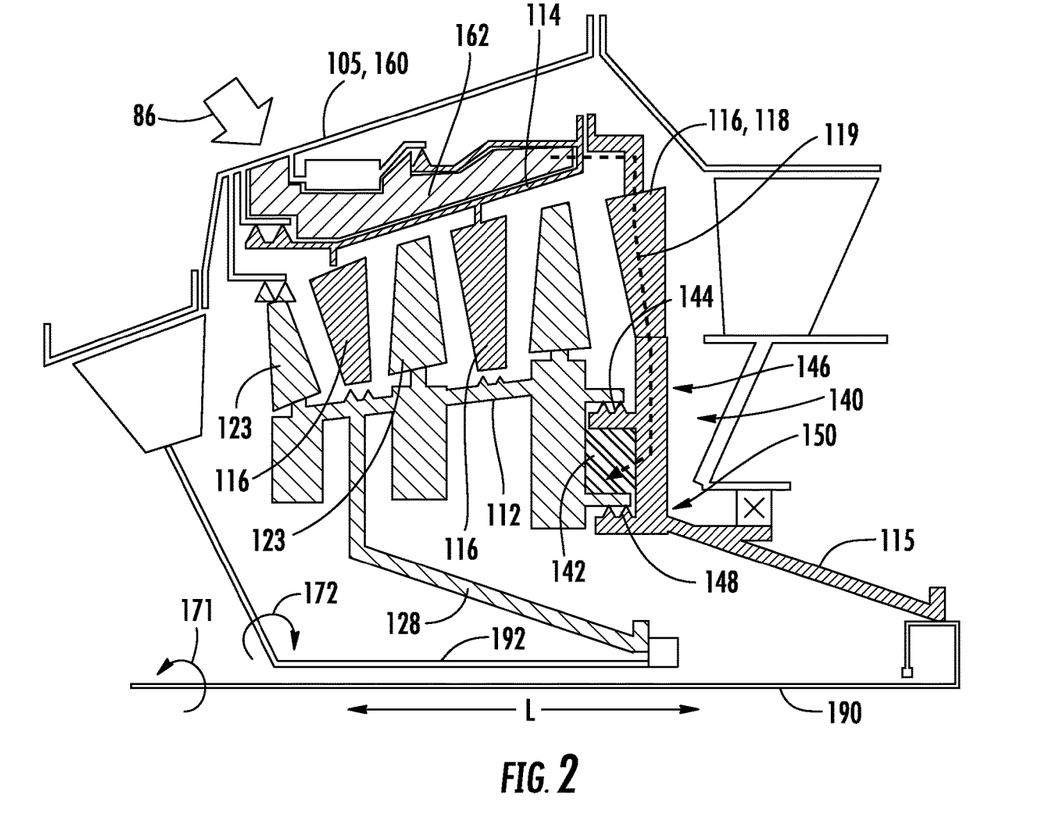
FIG. 2 is a schematic cross-sectional view of a turbine section of a gas turbine engine in accordance with an exemplary embodiment of the present disclosure.

Referring now to FIG. 2, an exemplary embodiment of the turbine section 90 of the engine 10 is generally provided. The turbine section 90 includes a stationary outer portion 105 and a first rotating component 110 interdigitated with a second rotating component 120 along the longitudinal direction L.

The first rotating component 110 includes an outer shroud 114 having a plurality of first airfoils 116 that extend inward of the outer shroud 114 along the radial direction R. The first rotating component 110 also includes an aft airfoil 118 defining a hollow passageway 119 and coupled to a radially extended first rotor portion 115.

The second rotating component 120 includes an inner shroud 112 having a plurality of second airfoils 123 that extend outward of the inner shroud 112 along the radial direction R. The second rotating component 120 includes a radially extended second rotor portion 128 extending from a second shaft 192 to the inner shroud 112.

In various embodiments, the inner shroud 112 and/or the outer shroud 114 are formed or defined by a plurality of hubs, disks, or drums defining an axial or longitudinal flowpath, such as a portion of a core flowpath 70 for the compressed air 82 and combustion gases 86 to flow through the engine 10 from the upstream end 99 to the downstream end 98.

In various embodiments, the outer shroud 114 may be coupled to one or more first airfoils 116 and the outer shroud 114 may extend along the longitudinal direction L. The plurality of first 116 may extend inward of the outer shroud 114 in interdigitation with the plurality of second airfoils 123 that extend along the radial direction R from the inner shroud 112 of the second rotating component 120. In various embodiments, a portion of the second rotating component 120 may be disposed upstream of one or more first airfoils 116 of the first rotating component 110 and in interdigitation with the first airfoils 116 that extended from the first rotating component 110.

In an exemplary embodiment, the first and second rotating components 110, 120 may together define at least three stages of rotating airfoils. In other exemplary embodiments, the first and second rotating components 110, 120 may together define between three and ten stages or rows of rotating airfoils.

In an exemplary embodiment of the present disclosure, the stationary outer portion 105 comprises a low pressure turbine outer band 160. In other exemplary embodiments, the stationary outer portion 105 may comprise other stationary components of the turbine section 90. The stationary outer portion 105 is connected to a portion of a compressor section 21 and receives a flow of air therefrom.

Figure 3:
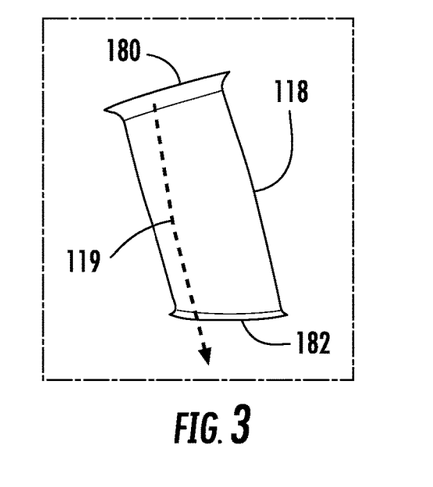
FIG. 3 is an enlarged view of a portion of an aft airfoil defining a hollow passageway of FIG. 2 in accordance with an exemplary embodiment of the present disclosure.

Referring to FIG. 3, an enlarged view of a portion of an aft airfoil 118 defining a hollow passageway 119 is illustrated. The hollow passageway 119 of the aft airfoil 118 includes a first end 180 and a second end 182. In exemplary embodiments, the aft airfoil 118 defines a hollow passageway 119 therethrough and the first end 180 of the hollow passageway 119 is in fluid communication with the passageway 162 of the stationary outer portion 105 and the second end 182 of the hollow passageway 119 is in fluid communication with the balance piston cavity 142 defined by the seal assembly 140.

Figure 4:
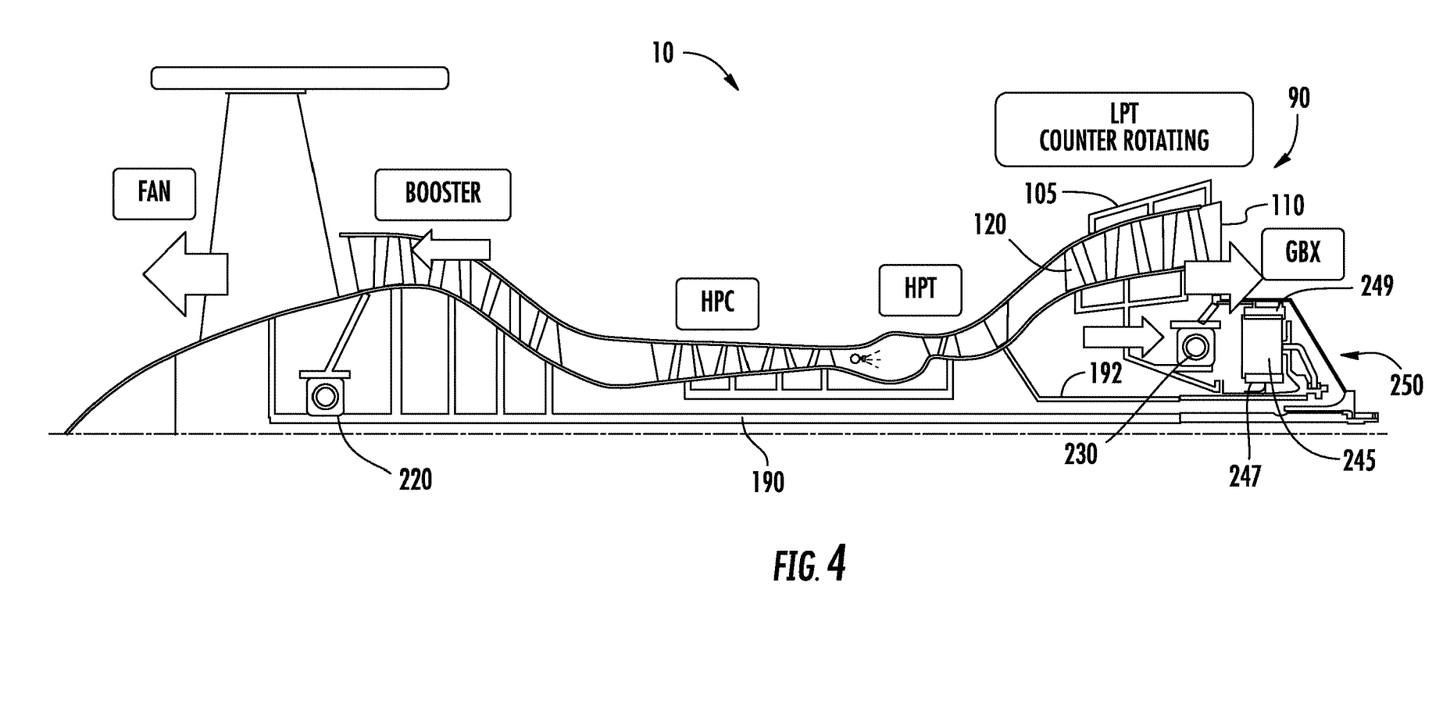
FIG. 4 is a schematic cross-sectional view of an exemplary gas turbine engine in accordance with another exemplary embodiment of the present disclosure.

Referring to FIG. 4, in an exemplary embodiment, the engine 10 further includes a front ball bearing portion 220 within a fan assembly 14; and a rear low pressure turbine high speed ball bearing portion 230 and a gear assembly 245 within the turbine section 90, such as inward along the radial direction R, or downstream of the turbine section 90 along the longitudinal direction L. For example, the gear assembly 245 may be disposed toward the downstream end 98 of the turbine section 90. In an exemplary embodiment, the gear assembly 245 is disposed downstream of the turbine section 90 within an exhaust frame portion 250. In one exemplary embodiment, the gear assembly 245 includes an input accessory gear portion 247 and an output accessory gear portion 249. A second shaft 192 of the engine 10 is connected to the input accessory 247 and provides power into the gear assembly 245. The second rotating component 120 is coupled to the second shaft 192 and provides power into the gear assembly 245. The first rotating component 110 is coupled to the output accessory 249 of the gear assembly 245. The output accessory 249 rotates the first rotating component 110 about the axial centerline 12 at a first speed. The second rotating component 120 coupled to the second shaft 192 and rotates about the axial centerline 12 at a second speed. In various embodiments, the second speed at which the second rotating component 120 rotates is greater than the first speed at which the first rotating component 110 rotates.

Referring to FIGS. 2 and 4, the engine 10 further includes a first shaft 190 that extends in the longitudinal direction L and through a portion of the gear assembly 245. The first rotor portion 115 of the first rotating component 110 is coupled to the first shaft 190. In various embodiments, the first rotor portion 115 of the first rotating component 110 is rotatably coupled to the output accessory 249 of the gear assembly 245. In one embodiment, the first rotor portion 115 defines a housing 170 generally surrounding the 2gear assembly 45 and coupled to the first shaft 190.

In exemplary embodiments, the first rotating component 110 rotates in a first direction 171 and the second rotating component 120 rotates in a second direction 172 opposite of the first direction 171. The first rotating component 110 coupled to the output accessory 249 of the gear assembly 245 via the first shaft 190 rotates in the first direction 171, as the second rotating component 120 coupled to the input accessory 247 of the gear assembly 245 via the second shaft 192 rotates in the second direction 172. As such, in exemplary embodiments, the gear assembly 245 is configured as a reversing reduction gear assembly.

In various embodiments, the second rotating component 120 includes a radially extended second rotor portion 128 extended from the second shaft 192 to the inner shroud 112. The second rotor portion 128 of the second rotating component 120 is rotatably coupled to the second shaft 192. In exemplary embodiments, the inner shroud 112 and the second rotor portion 128 may define an integral structure. In one embodiment, the second airfoils 123 may further define an integral structure with the second rotor portion 128 and the inner shroud 112. In another embodiment, the second rotor portion 128 defines a hub into which the plurality of second airfoils 123 installs to.

In exemplary embodiments, the balance piston cavity 142 also allows for the compensation of the axial thrust generated by the high speed portions of the second rotor portion 128. For example, the balance piston cavity 142 provides the advantage of reducing the axial thrust on the bearing 230.

Referring to FIG. 2, in an exemplary embodiment of the present disclosure, a seal assembly 140 is located between a portion of the first rotating component 110 and the second rotating component 120. A seal assembly 140 of the present disclosure defines a balance piston cavity 142 therebetween. The balance piston cavity 142 is in fluid communication with the hollow passageway 119 of the aft airfoil 118. In this manner, a rotating frame or rotating portion of the turbine section 90 includes a hollow rotor, i.e., hollow passageway 119 of the aft airfoil 118, feeding a balance piston cavity 142 defined by seal assembly 140.

In an exemplary embodiment, the seal assembly 140 includes a first seal 144 and a second seal 148 and the balance piston cavity 142 is defined between the first seal 144 and the second seal 148. Referring to FIG. 2, the first seal 144 is located between a first portion 146 of the first rotating component 110 and the second rotating component 120 and the second seal 148 is located between a second portion 150 of the first rotating component 110 and the second rotating component 120.

In exemplary embodiments, a seal assembly 140 of the present disclosure is a labyrinth seal. However, it is contemplated that other seals can be used with a system of the present disclosure. For example, a seal assembly 140 of the present disclosure can be a pad and blade seal, a brush seal, a similar seal, or any other seal mechanism. In one exemplary embodiment, the seal assembly 140 is integral to a portion of the first rotating component 110. In other exemplary embodiments, the seal assembly 140 is separate from a portion of the first rotating component 110 and is coupled to a portion of the first rotating component 110 via a bolt or other fastener.

Referring to FIG. 2, a flow path of air through a rotating frame or rotating portion of the turbine section 90 of the present disclosure including a hollow rotor, i.e., hollow passageway 119 of the aft airfoil 118, feeding a balance piston cavity 142 defined by seal assembly 140 will now be described.

Referring to FIG. 2, the hollow passageway 119 of the aft airfoil 118 is in fluid communication with a passageway 162 of the stationary outer portion 105 and the balance piston cavity 142 defined by the seal assembly 140 is in fluid communication with the hollow passageway 119 of the aft airfoil 118. Accordingly, a flow path of the present disclosure comprises a flow of air 86 being routed through the passageway 162 of the stationary outer portion 105 and the hollow passageway 119 of the aft airfoil 118 to the balance piston cavity 142 defined by the seal assembly 140. In this manner, a pressure of the flow of air 86 within the balance piston cavity 142 is controlled to provide an axial thrust that counteracts a thrust load on the second rotor portion 128. In other words, the embedded air channels of the present disclosure allow for the control of a counteracting axial thrust to balance a thrust load on the second rotor portion 128. Furthermore, the embedded air channels of the present disclosure allow for the control of pressurizing chambers of the turbine section 90, e.g., the balance piston cavity 142. Advantageously, a balance piston cavity 142 of the present disclosure can be configured according to a desired range of pressures based on particular flight conditions.

Another benefit of the flow of air 86 through the stationary outer portion 105 and a rotating frame or rotating portion of the turbine section 90 of the present disclosure including a hollow rotor, i.e., hollow passageway 119 of the aft airfoil 118, feeding a balance piston cavity 142 defined by seal assembly 140, is that this flow of air provides an integrated cooling system to the components of the turbine section 90.

In one exemplary embodiment, an aft airfoil 118 defining a hollow passageway 119 of the present disclosure, and/or other components of the turbine section 90, are formed using precision casting, advanced machining, or other traditional manufacturing machines or methods. In one exemplary embodiment, an aft airfoil 118 defining a hollow passageway 119 of the present disclosure, and/or other components of the turbine section 90, are formed using additive manufacturing machines or methods. As described in detail below, exemplary embodiments of the formation of an aft airfoil 118 defining a hollow passageway 119 involve the use of additive manufacturing machines or methods. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

In an exemplary aspect of the present disclosure, a method is provided for controlling a pressure within a turbine section of a gas turbine engine, wherein the gas turbine engine defines a longitudinal direction and a radial direction, and the turbine section includes a stationary outer portion, a first rotating component, and a second rotating component. The method includes providing the first rotating component with an aft airfoil defining a hollow passageway and coupled to a radially extended first rotor portion, wherein the hollow passageway is in fluid communication with the stationary outer portion, and wherein the second rotating component is coupled to a radially extended second rotor portion; providing a seal assembly between a portion of the first rotating component and the second rotating component, the seal assembly defining a balance piston cavity therebetween, wherein the balance piston cavity is in fluid communication with the hollow passageway; routing a flow of air through the stationary outer portion and the hollow passageway to the balance piston cavity; and controlling a pressure of the flow of air within the balance piston cavity to provide an axial thrust that counteracts a thrust load on the second rotor portion.

Further aspects of the invention are provided by the subject matter of the following clauses:

1. A gas turbine engine, wherein the gas turbine engine defines a longitudinal direction and a radial direction, the gas turbine engine comprising: a turbine section comprising a stationary outer portion, a first rotating component, and a second rotating component, wherein the first rotating component includes an aft airfoil defining a hollow passageway and coupled to a radially extended first rotor portion, wherein the hollow passageway is in fluid communication with the stationary outer portion, wherein the second rotating component is coupled to a radially extended second rotor portion; and a seal assembly between a portion of the first rotating component and the second rotating component, the seal assembly defining a balance piston cavity therebetween, wherein the balance piston cavity is in fluid communication with the hollow passageway, wherein a flow of air is routed through the stationary outer portion and the hollow passageway to the balance piston cavity, and wherein a pressure of the flow of air within the balance piston cavity is controlled to provide an axial thrust that counteracts a thrust load on the second rotor portion.

2. The gas turbine engine of any preceding clause, wherein the first rotating component is interdigitated with the second rotating component along the longitudinal direction.

3. The gas turbine engine of any preceding clause, wherein the first rotating component rotates in a first direction and the second rotating component rotates in a second direction opposite of the first direction.

4. The gas turbine engine of any preceding clause, wherein the second rotating component rotates at a speed greater than the first rotating component.

5. The gas turbine engine of any preceding clause, wherein the seal assembly comprises: a first seal between a first portion of the first rotating component and the second rotating component; and a second seal between a second portion of the first rotating component and the second rotating component, wherein the balance piston cavity is defined between the first seal and the second seal.

6. The gas turbine engine of any preceding clause, wherein the balance piston cavity reduces a thrust on a bearing in the turbine section.

7. The gas turbine engine of any preceding clause, wherein the flow of air routed through the stationary outer portion and the hollow passageway to the balance piston cavity provides an integrated cooling system to the turbine section.

8. The gas turbine engine of any preceding clause, wherein the stationary outer portion comprises a low pressure turbine outer band.

9. The gas turbine engine of any preceding clause, wherein the low pressure turbine outer band is directly connected to a portion of a compressor section.

10. A method for controlling a pressure within a turbine section of a gas turbine engine, wherein the gas turbine engine defines a longitudinal direction and a radial direction, and the turbine section comprising a stationary outer portion, a first rotating component, and a second rotating component, the method comprising: providing the first rotating component with an aft airfoil defining a hollow passageway and coupled to a radially extended first rotor portion, wherein the hollow passageway is in fluid communication with the stationary outer portion, and wherein the second rotating component is coupled to a radially extended second rotor portion; providing a seal assembly between a portion of the first rotating component and the second rotating component, the seal assembly defining a balance piston cavity therebetween, wherein the balance piston cavity is in fluid communication with the hollow passageway; routing a flow of air through the stationary outer portion and the hollow passageway to the balance piston cavity; and controlling a pressure of the flow of air within the balance piston cavity to provide an axial thrust that counteracts a thrust load on the second rotor portion.

11. The method of any preceding clause, wherein the first rotating component is interdigitated with the second rotating component along the longitudinal direction.

12. The method of any preceding clause, wherein the first rotating component rotates in a first direction and the second rotating component rotates in a second direction opposite of the first direction, and wherein the second rotating component rotates at a speed greater than the first rotating component.

13. The method of any preceding clause, wherein the seal assembly comprises: a first seal between a first portion of the first rotating component and the second rotating component; and a second seal between a second portion of the first rotating component and the second rotating component, wherein the balance piston cavity is defined between the first seal and the second seal.

14. The method of any preceding clause, wherein the balance piston cavity reduces a thrust on a bearing in the turbine section.

15. The method of any preceding clause, wherein the flow of air routed through the stationary outer portion and the hollow passageway to the balance piston cavity provides an integrated cooling system to the turbine section.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A gas turbine engine, wherein the gas turbine engine defines a longitudinal direction and a radial direction, the gas turbine engine comprising:
    a turbine section comprising a stationary outer portion, a first rotating component, and a second rotating component, wherein the first rotating component includes an aft airfoil defining a hollow passageway and coupled to a radially extended first rotor portion, wherein the hollow passageway is in fluid communication with the stationary outer portion, wherein the second rotating component is coupled to a radially extended second rotor portion; and
    a seal assembly between a portion of the first rotating component and the second rotating component, the seal assembly defining a balance piston cavity therebetween, wherein the balance piston cavity is in fluid communication with the hollow passageway,
    wherein a flow of air is routed through the stationary outer portion and the hollow passageway to the balance piston cavity, and
    wherein a pressure of the flow of air within the balance piston cavity is controlled to provide an axial thrust that counteracts a thrust load on the second rotor portion.

2. The gas turbine engine of claim 1, wherein the first rotating component is interdigitated with the second rotating component along the longitudinal direction.

3. The gas turbine engine of claim 2, wherein the first rotating component rotates in a first direction and the second rotating component rotates in a second direction opposite of the first direction.

4. The gas turbine engine of claim 3, wherein the second rotating component rotates at a speed greater than the first rotating component.

5. The gas turbine engine of claim 1, wherein the seal assembly comprises:
    a first seal between a first portion of the first rotating component and the second rotating component; and
    a second seal between a second portion of the first rotating component and the second rotating component,
    wherein the balance piston cavity is defined between the first seal and the second seal.

6. The gas turbine engine of claim 1, wherein the balance piston cavity reduces a thrust on a bearing in the turbine section.

7. The gas turbine engine of claim 1, wherein the flow of air routed through the stationary outer portion and the hollow passageway to the balance piston cavity provides an integrated cooling system to the turbine section.

8. The gas turbine engine of claim 1, wherein the stationary outer portion comprises a low pressure turbine outer band.

9. The gas turbine engine of claim 8, wherein the low pressure turbine outer band is directly connected to a portion of a compressor section.

10. A method for controlling a pressure within a turbine section of a gas turbine engine, wherein the gas turbine engine defines a longitudinal direction and a radial direction, and the turbine section comprising a stationary outer portion, a first rotating component, and a second rotating component, the method comprising:
- providing the first rotating component with an aft airfoil defining a hollow passageway and coupled to a radially extended first rotor portion, wherein the hollow passageway is in fluid communication with the stationary outer portion, and wherein the second rotating component is coupled to a radially extended second rotor portion;
- providing a seal assembly between a portion of the first rotating component and the second rotating component, the seal assembly defining a balance piston cavity therebetween, wherein the balance piston cavity is in fluid communication with the hollow passageway;
- routing a flow of air through the stationary outer portion and the hollow passageway to the balance piston cavity; and
- controlling a pressure of the flow of air within the balance piston cavity to provide an axial thrust that counteracts a thrust load on the second rotor portion.

11. The method of claim 10, wherein the first rotating component is interdigitated with the second rotating component along the longitudinal direction.

12. The method of claim 11, wherein the first rotating component rotates in a first direction and the second rotating component rotates in a second direction opposite of the first direction, and wherein the second rotating component rotates at a speed greater than the first rotating component.

13. The method of claim 10, wherein the seal assembly comprises:
- a first seal between a first portion of the first rotating component and the second rotating component; and
- a second seal between a second portion of the first rotating component and the second rotating component,
- wherein the balance piston cavity is defined between the first seal and the second seal.

14. The method of claim 10, wherein the balance piston cavity reduces a thrust on a bearing in the turbine section.

15. The method of claim 10, wherein the flow of air routed through the stationary outer portion and the hollow passageway to the balance piston cavity provides an integrated cooling system to the turbine section.

\* \* \* \* \*